United States Patent [19]
Blumenstock et al.

[11] Patent Number: 5,197,442
[45] Date of Patent: Mar. 30, 1993

[54] TANK-VENTING ARRANGEMENT AND METHOD OF OPERATING THE SAME

[75] Inventors: Andreas Blumenstock, Ludwigsburg; Helmut Denz; Ulrich Steinbrenner, both of Stuttgart; Ernst Wild, Oberriexingen, all of Fed. Rep. of Germany

[73] Assignee: Robert Bosch GmbH, Stuttgart, Fed. Rep. of Germany

[21] Appl. No.: 811,294

[22] Filed: Dec. 20, 1991

[30] Foreign Application Priority Data

Dec. 20, 1990 [DE] Fed. Rep. of Germany ....... 4040895

[51] Int. Cl.$^5$ ..................... F02M 33/02; F02B 77/00
[52] U.S. Cl. .................. 123/520; 123/198 D
[58] Field of Search ............. 123/516, 518, 519, 520, 123/521, 198 D

[56] References Cited

U.S. PATENT DOCUMENTS

| | | | |
|---|---|---|---|
| 4,343,281 | 8/1982 | Uozumi | 123/520 |
| 4,702,216 | 10/1987 | Haruta | 123/520 |
| 4,703,737 | 11/1987 | Cook | 123/520 |
| 4,862,856 | 9/1989 | Yokoe | 123/519 |
| 4,872,439 | 10/1989 | Sonoda et al. | |
| 4,903,672 | 2/1990 | MacKinnon | 123/520 |
| 5,067,468 | 11/1991 | Otowa | 123/520 |

FOREIGN PATENT DOCUMENTS

| | | | |
|---|---|---|---|
| 0055226 | 5/1979 | Japan | 123/520 |
| 0128650 | 10/1980 | Japan | 123/520 |

Primary Examiner—Carl S. Miller
Attorney, Agent, or Firm—Walter Ottesen

[57] ABSTRACT

A tank-venting arrangement includes: a tank having a tank closure; an electrically drivable check valve; an adsorption filter; connecting lines for interconnecting the above components; a difference pressure sensor which measures the pressure difference between the pressure in the tank and the ambient pressure and supplies a pressure difference signal; a comparator which, at least for a running engine, compares the pressure difference signal to upper and lower threshold values and supplies an opening signal to the check valve to open the latter when the pressure difference signal is greater than the upper threshold value and a closure signal for closing the check valve when the pressure difference signal drops below the lower threshold value; and, a detector unit which supplies an opening signal to the check valve for opening the check valve when the sensor determines a possible opening of the tank and a closure signal for closing the check valve when the sensor determines a possible closure of the tank. With the aid of the check valve and the difference pressure sensor which measures the pressure difference between the pressure in the tank and the ambient pressure, the tank-venting arrangement can be so operated that at least for a running engine, a desired maximum overpressure in the tank can be obtained relative to the ambient pressure independently of the extent of the underpressure in that part of the arrangement forward of the check valve.

8 Claims, 2 Drawing Sheets

TANK-VENTING ARRANGEMENT AND METHOD OF OPERATING THE SAME

FIELD OF THE INVENTION

The invention relates to a tank-venting arrangement as utilized in motor vehicles and a method for operating the arrangement.

BACKGROUND OF THE INVENTION

It is known to use check valves in tank-venting arrangements. The disclosure utilizes the term "overpressure valve" for a check valve which opens in response to overpressure in the tank while the term "underpressure valve" is used for a check valve which opens in response to underpressure in the tank.

U.S. Pat. No. 4,872,439 discloses a tank-venting arrangement having the following components: a tank having a tank closure; an active charcoal filter; a first connecting unit between the tank and the active charcoal filter wherein an electrically controllable check valve is present; a second connecting unit between the tank and the active charcoal filter wherein an overpressure valve and an underpressure valve are connected in parallel; a tank-venting valve; a tank closure sensor which supplies a tank opening signal when the tank closure is opened; a switch unit which receives the tank opening signal and opens the check valve in response thereto; and, a control unit for controlling the tank-venting valve.

The valves in the connecting units between the tank and the active charcoal filter ensure that an overpressure builds up in the tank which has the desired consequence that the vapor of the fuel in the tank is reduced. Fuel vapor flows into the active charcoal filter where it is adsorbed only when the pressure in the tank increases above the pressure at which the underpressure valve opens. As soon as the control unit drives the tank-venting valve, the active charcoal filter is flushed with air with the adsorbed fuel being desorbed. The flushing air charged with fuel vapor is supplied to the intake air of the internal combustion engine on which the arrangement is provided.

The case of tanking is problematic in such a tank-venting arrangement with overpressure. The tank cap can fly off because of overpressure when the cap is opened. In order to prevent this condition, the known arrangement has the above-mentioned tank closure sensor which ensures that the check valve leading to the active charcoal filter is opened when the tank closure is opened. In this way, the overpressure in the tank decays before the tank cover is unscrewed.

Underpressures of various magnitude develop in the active charcoal filter in dependence upon the operating condition of the engine on which the tank-venting arrangement is operated. These underpressures produce effects which extend to the above-mentioned overpressure valve which causes this valve to be already partially open when the pressure in the tank lies only insignificantly above the ambient pressure. In this way, the actual purpose of the tank-venting arrangement designed for overpressure is lost, namely, to reduce the degree of vaporization of the fuel in the tank. The above-mentioned unwanted effect can be reduced in a way which ensures that the active charcoal filter is vented as well as possible; however, a very good venting can only be achieved with a new filter. The underpressure acting on the overpressure valve becomes evermore intense with increasing age of the filter.

SUMMARY OF THE INVENTION

In view of the foregoing, it is an object of the invention to provide a tank-venting arrangement with overpressure wherein the overpressure obtainable is essentially independent of aging. It is still another object of the invention to provide a method of operating a tank-venting arrangement with which the above-mentioned purpose is obtained.

The tank-venting arrangement according to the invention includes: a tank having a tank closure; an electrically drivable check valve; an adsorption filter; connecting lines for interconnecting the above components; a difference pressure sensor which measures the pressure difference between the pressure in the tank and the ambient pressure and supplies a pressure difference signal; a comparator which, at least for a running engine, compares the pressure difference signal to upper and lower threshold values and supplies an opening signal to the check valve to open the latter when the pressure difference signal is greater than the upper threshold value and a closure signal for closing the check valve when the pressure difference signal drops below the lower threshold value; and, a detector unit which supplies an opening signal to the check valve for opening the check valve when the sensor determines a possible opening of the tank and a closure signal for closing the check valve when the sensor determines a possible closure of the tank.

The method of the invention is for operating a tank-venting arrangement which includes a tank having a tank closure, an electrically drivable check valve, an adsorption filter and connecting units for interconnecting these components. The method of the invention includes the following steps: measuring the differential pressure between the pressure in the tank and the ambient at least when the engine is running; opening the check valve either when the pressure difference increases above a threshold value or an indication is present for a possible opening of the tank; and, closure of the check valve either when the pressure difference drops below a lower threshold value or an indication is present for possible closure of the tank.

It is decisive for the tank-venting arrangement of the invention and the method of the invention that they utilize a difference pressure sensor for controlling the check valve. The sensor is so mounted and configured that it measures the pressure difference between the pressure in the tank and the ambient pressure. In this way, it is ensured that a defined overpressure relative to the ambient pressure is present in the tank independently of the actual underpressure in the adsorption filter. This has the consequence that very little fuel vaporizes and that the active charcoal filter is often regenerated when no vapor comes from the tank.

When a vehicle having the check valve is tanked, the condition must be prevented that vapor escapes at overpressure from the tank when the latter is opened. The above-mentioned detector unit operates to determine the opening/closing operation. This detector unit can be configured as a tank closure sensor as disclosed in the arrangement of U.S. Pat. No. 4,872,439; however, it is possible to let this detector unit check other signals especially the running condition of the engine. The possibility of tanking the vehicle is present when the ignition of the engine is switched off. Accordingly, the check valve is opened when the ignition is switched off and is kept open for a pregiven time span. For the same purpose, signals from door-opening sensors and/or seat-pressure sensors can be interrogated and/or a road-speed signal can be utilized.

The check valve can be so configured that it is opened in the non-driven condition. In this case, it opens not only when it is driven by the pressure-difference sensor because of an overpressure in the tank which is too high; instead, the drive can be ended when the ignition of the corresponding engine is switched off. The tank cap can then be unscrewed without the danger of vapors escaping or especially without the danger of the cap flying off. The start of the engine is then evaluated as a signal that the tank operation should be concluded and, accordingly, the check valve can again be driven so that it blocks.

However, it is more advantageous to use a check valve which is closed in the non-driven condition. For this purpose, it is ensured that the tank is held under overpressure even during the standstill times of the vehicle which are typically longer than the drive times. However, and as described above, the overpressure must be reduced before the complete threadable disengagement of the tank cap with the aid of the detector unit.

To further increase the reliability that no or only little vapor will escape from the tank when the tank is opened, it is advantageous to make the level of the threshold values for the pressure difference to be dependent upon values of operating parameters with the level of the threshold values being reduced for such values of operating parameters which point to an opening of the tank which may possibly soon occur. The most important parameter for this purpose is the road speed. If this drops below, for example, 20 km/hour, then it cannot be excluded that the vehicle will soon halt and be tanked. If this is indeed the case, then the residual pressure can be quickly reduced. If this is not the case, the pressure reduction which has been undertaken is harmless since for low road speeds, high underpressures are often present in the intake pipe of the engine and, accordingly, the regeneration of the adsorption filter operates especially well. In lieu of the road speed, the engine speed and/or the load can be used for the same purpose. The level of the threshold values can be dependent directly upon the magnitude of the monitored values or, below an operating parameter threshold, first pressure threshold values and others therebelow can be set. Combinations of these procedures are also possible. The upper threshold value can, for example, be dropped from 40 to 10 mbar or can be dropped still further.

Another advantage is that the check valve is additionally driven in dependence upon diagnostic results. If a diagnosis determines a leak between the tank and the check valve, then it is advantageous to hold the check valve open continuously in order to draw off by suction as much fuel vapor as possible so that the vapor does not escape through the leak to the ambient.

For reasons of safety, it is advantageous to arrange an overpressure valve in parallel with the check valve and an underpressure valve at the tank closure. However, when mounting and especially when dimensioning the overpressure valve, care must be taken that this valve does not already open because of a high underpressure at its low pressure end when the overpressure is not yet present in the tank starting from which pressure the check valve is opened.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
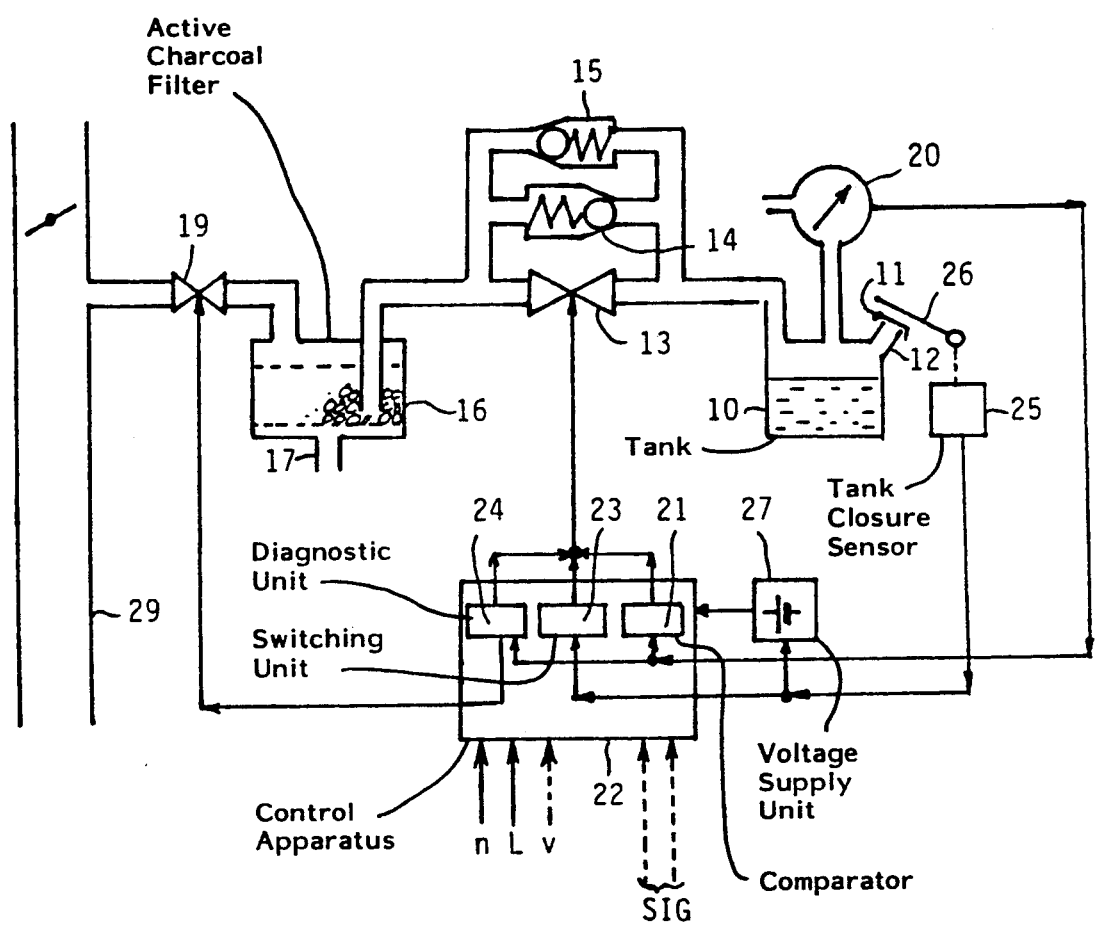
FIG. 1 is a schematic of an overpressure tank-venting arrangement according to an embodiment of the invention; and, FIG. 2 is a flowchart for explaining an embodiment of the method of the invention for operating an overpressure tank-venting arrangement.

The tank-venting arrangement of FIG. 1 includes the following components: a tank 10 having a tank stub 12 closed by a tank cap 11; an electrically drivable check valve 13 and an overpressure valve 14 and an underpressure valve 15 connected in parallel to the check valve; an active charcoal filter 16 as an adsorption filter having a venting line 17; a tank-venting valve 19 and connecting units between the above-mentioned components. The foregoing aspects of the tank-venting arrangement are known.

According to a feature of the invention, a difference pressure sensor 20 is provided on the tank 10 of this arrangement having a check valve 13. The output signal of the difference pressure sensor 20 controls the check valve 13 in dependence upon the overpressure in the tank 10. The difference pressure sensor 20 measures the pressure difference between the pressure in the tank and the ambient pressure.

The pressure difference signal from the difference pressure sensor 20 is evaluated in comparator unit 21 which is part of a control apparatus 22. The comparator unit compares the pressure difference signal to an upper and a lower threshold value and supplies an opening signal to the check valve for opening the latter when the pressure difference signal is greater than the upper threshold value. Otherwise, the pressure difference sensor supplies a closure signal to the check valve for closing the latter when the pressure difference signal drops below the lower threshold value.

According to a preferred embodiment of FIG. 1, the control apparatus 22, in addition to the comparator unit 21, also includes a switching unit 23 and a diagnostic unit 24. the switching unit 23 receives a signal from a tank closure sensor 25 which coacts with a tank closure 26 configured as a flap which covers the tank cap 11. As soon as the tank closure 26 is opened, the tank closure sensor 25 emits a tank opening signal to the switching unit 23 which then opens the check valve 13 independently of the value of the pressure difference signal. The tank-venting signal also controls a voltage supply unit 27 which supplies the control unit 22 with energy as long as the tank closure 26 is open. In this way, the switching unit 23 has adequate electrical energy for driving the check valve 13 for the case where the vehicle is tanked when the ignition is switched off.

The switching unit 23 must not necessarily be disposed within the control apparatus 22; instead, the switching unit 23 can be an independent unit supplied directly with voltage. In different cases, it is however more advantageous to configure the switching unit 23 as part of the control apparatus 22 when, during tanking, it is intended that data be detected and evaluated such as data with respect to the type of fuel as it is in the tank after tanking is completed.

The diagnostic unit 24 in the control apparatus 22 operates to open the check valve 13 when a diagnosis of the arrangement shows that a leak is present in the arrangement. Such a leak can occur when the tank cap 11 is not properly screwed on. In this case, no overpressure can develop in the tank 10 and it is advantageous to draw off as much fuel vapor as possible via the tank venting.

The seal tightness can for example be checked in that for a closed valve an investigation can be made of the time dependent change of the pressure difference signal from the difference pressure sensor 20 at the tank 10. If this signal does not change over a longer time such as 15 minutes to a half hour or over a longer driving distance for example 20 to 30 km, this is an indication that either there is a large leak present or the sensor is defective. In any event, a considerable defect is present.

When the leak cannot be localized, the decision as the whether the check valve 13 should be opened or closed for safety reasons is dependent upon, if, in a particular tank-venting arrangement, a defect would be more likely forward of the check valve or more likely rearward thereof. In the last case, the check valve would be opened; otherwise the check valve would be closed. Since a leak is usually caused by an incorrect closure of the tank, it is generally best to open the check valve when a leak is determined.

As shown in FIG. 1, the opening signals from the comparator unit 21, the switching unit 23 and the diagnostic unit 24 are all supplied on the same drive line for the control valve 13. This indicates that the signals are tied to each other in the sense of an OR-connection; that is, it is sufficient for opening the check valve 13 if one of the three above-mentioned units emits an opening signal. This means that it is not sufficient to close the valve if only one of the units drives the valve toward closing; rather, the check valve 13 can only then be closed when each of the three units drives in a direction for closure.

In order to protect the tank 10 against damage in the event that the check valve 13 should no longer open because of an error, the overpressure valve 14 is connected parallel to the check valve 13. The overpressure valve 14 is so dimensioned that it actually opens only in an emergency, for example, only at 200 mbar overpressure; whereas, the check valve 13 for example opens at 60 mbar and closes at 30 mbar. The opening pressure for the overpressure valve 14 and the switching pressures for the check valve 13 are greatly dependent upon the strength of the tank 10. It is noted that the check valve 13 is driven as a consequence of the pressure difference as it is present between the tank and the ambient. In contrast, the overpressure valve 14 is driven by the pressure difference as it is present between the tank and the active charcoal filter 16. The overpressure valve 14 is configured for a larger opening difference pressure than the difference pressure at which the check valve is opened. For this reason, it is ensured that the overpressure valve 14 does not open ahead of the check valve 13 even when an underpressure is present at the low pressure side of the overpressure valve 14. If the overpressure valve 14 does indeed open ahead of the check valve 13 in borderline cases, this is not critical since this can only be the case when an intense underpressure is present in the intake pipe 29 which has the consequence that fuel vapor is immediately drawn off by suction which passes through the overpressure valve 14 in an unwanted manner.

The underpressure valve 15 protects the tank 10 against an underpressure which is too great. In order to increase the safety against underpressure still further, the check valve 13 can be driven when the pressure difference signal from the difference pressure sensor 20 indicates underpressure in the tank.

Figure 2:
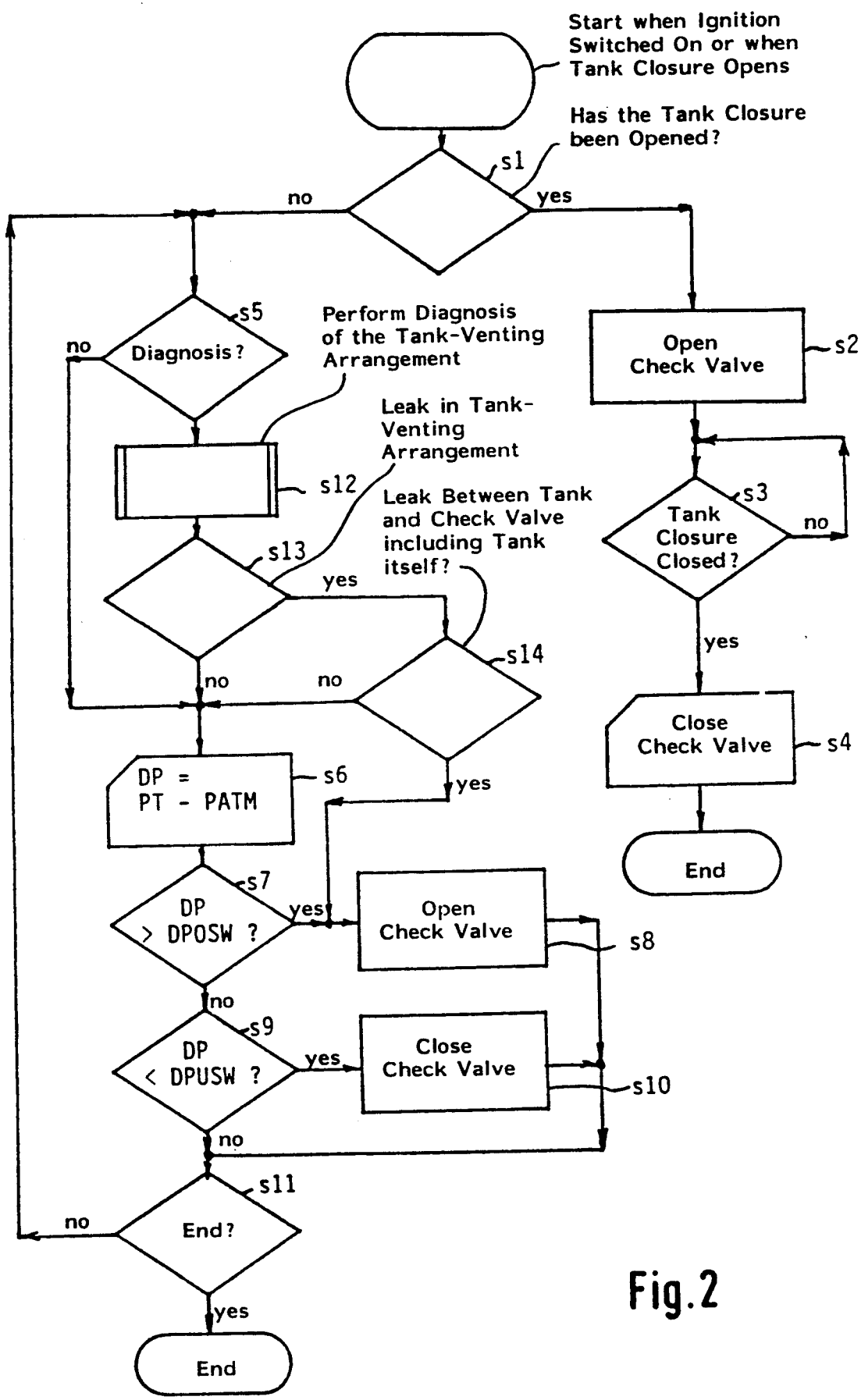

The above-described sequences are explained with respect to FIG. 2 as a preferred embodiment of the method for driving a tank-venting arrangement.

The method starts with switching on the ignition or opening the tank closure. In a next step s1, the investigation is made as to whether the tank closure has been opened. Two independent component methods now take place in dependence upon the result of this inquiry.

If the tank closure was opened, then the check valve is opened (step s2), and then a check (step s3) is made as to whether the tank closure is again closed and this check is made until the tank closure is indeed closed. Thereafter, the check valve is again closed (step s4) whereby the end of the method is reached.

If instead in step s1 the result is obtained that the tank closure had not been opened that is, the method was triggered by switching on the ignition, then an investigation is made (step s5) as to whether a tank-venting arrangement diagnosis should be carried out. Mostly, this is not the case and, in which case, step s6 follows wherein the pressure difference DP is measured from the pressure DT in the tank and the ambient pressure DATM. If in a follow-on step s7, the result is obtained that the pressure difference DP is greater than an upper threshold value DPOSW, the check valve is opened (step s8). Otherwise, a check (step s9) is made as to whether the pressure difference DP is below a lower threshold value DPUSW. If this is the case, then the check valve is closed (step s10). Otherwise, in the next step s11, a check is made as to whether the method should be ended, for example, because the ignition is switched off. If this is the case, the method is ended.

If in step s11, it develops that the method is to be continued further, there is a return to step s5 with a renewed inquiry as to whether the diagnosis should be carried out. If this is indeed the case, then a diagnosis of the arrangement is carried out in a subprogram step s12, for example, a diagnosis as described above. If it develops in a subsequent inquiry step s13 that the arrangement is tight, then the above-described sequence starts at step s6. Otherwise, a check is made in step s14 as to whether the arrangement between the tank and check valve including the tank itself leaks. If this is not the case, then the sequence described follows starting at step s6. Otherwise, step s8 is reached, that is, the step of opening the check valve.

In FIG. 1, various signals are indicated at the control apparatus 22, namely, those for engine speed (n), the load L as well as the signal for the road speed (v) and for variables which together are identified by SIG. The last-mentioned signals are especially those signals emitted by door-opening sensors or seat-pressure sensors.

Values for the engine speed and load are needed by the control apparatus 22 for many purposes such as for controlling the tank venting and for performing a diagnosis of the tank arrangement. The signals shown schematically are then in part or in combination with the above of interest when the tank closure sensor 25 is omitted. These signals then supply indications as to the possiblity that the tank could be opened as described above. The road-speed signal can advantageously also be used for settin the overpressure threshold values as likewise described above.

It is understood that the foregoing description is that of the preferred embodiments of the invention and that various changes and modifications may be made thereto without departing from the spirit and scope of the invention as defined in the appended claims.

What is claimed is:

1. A method for operating a tank-venting arrangement on a motor vehicle having an engine, the tank-venting arrangement including a tank having a tank closure, an adsorption filter and check valve interconnecting the tank and the adsorption filter, the method comprising the steps of:
   measuring the pressure difference between the pressure in the tank and the ambient pressure at least when the engine is running;
   keeping the check valve closed to maintain an overpressure in the tank in a predetermined interval during running of the internal combustion engine when no indication is present that the tank may be opened;
   opening the check valve when one of the following occurs: the pressure difference increases beyond an upper thereshold valve and an indication is present that the tank may be opened; and,
   closing the check valve when one of the following occurs: the pressure difference drops below a lower threshold value and an indication is present that the tank may be closed.

2. The method of claim 1, further comprising:
   checking whether the tank closure is being opened or is being closed to obtain an indication as to an opening/closure operation; and, then performing one of the following steps:
   controlling the check valve to open when the check shows that the tank closure is being opened; or,
   controlling the check valve to close when the check shows that the tank closure is closed.

3. A method for operating a tank-venting arrangement on a motor vehicle having an engine, the tank-venting arrangement including a tank having a tank closure, an adsorption filter and a check valve interconnecting the tank and the adsorption filter, the method comprising the steps of:
   measuring the pressure difference between the pressure in the tank and the ambient pressure at least when the engine is running;
   opening the check valve when one of the following occurs: the pressure difference increases beyond an upper threshold value and an indication is present that the tank may be opened; and,
   closing the check valve when one of the following occurs: the pressure difference drops below a lower threshold value and an indication is present that the tank may be closed;
   the operation of the engine being used as an indication for the opening/closing operation of the tank and the method including the further steps of:
   opening the check valve when the engine is switched off; and,
   after a pregiven time span has elapsed after the opening of the check valve, again closing the check valve.

4. The method of claim 1, wherein the level of the threshold values for the pressure difference is dependent upon values of operating parameters and the level of said threshold values is reduced with such values of the operating parameters which point to an opening of the tank closure which may occur soon.

5. A method for operating a tank-venting arrangement on a motor vehicle having an engine, the tank-venting arrangement including a tank having a tank closure, an adsorption filter and a check valve interconnecting the tank and the adsorption filter, the method comprising the steps of:
   measuring the pressure difference between the pressure in the tank and the ambient pressure at least when the engine is running;
   opening the check valve when one of the following occurs: the pressure difference increases beyond an upper threshold value and an indication is present that the tank may be opened; and,
   closing the check valve when one of the following occurs: the pressure difference drops below a lower threshold value and an indication is present that the tank may be closed;
   checking as to whether said tank-venting arrangement is tight; and, controlling the check valve to open if a leak is determined.

6. A tank-venting arrangement comprising:
   a tank having a tank closure;
   an adsorption filter;
   an electrically drivable check valve interconnecting said tank and said adsorption filter;
   a difference pressure sensor for measuring the pressure difference between the pressure in said tank and the ambient and emitting a pressure difference signal indicative of said pressure difference;
   comparator means for comparing said pressure difference signal to an upper and a lower threshold value and for supplying an opening signal to said check valve for opening said check valve when said pressure difference signal is greater than said upper threshold value and for supplying a closing signal to said check valve for closing said check valve when said pressure difference signal drops below said lower threshold value thereby maintaining a predetermined overpressure relative to atmospheric pressure in said tank independently of the pressure in said adsorption filter during operation of the vehicle and while no opening of said tank closure is expected; and,
   detector means for making a determination of a possible opening of the tank and supplying an opening signal to said check valve when said determination is made and for making a determination of a possible closing of the tank and supplying a closure signal to said check valve when said determination of possible closing is made.

7. The tank-venting arrangement of claim 6, further comprising a tank closure sensor for emitting a tank opening signal when the tank closure is opened; and, a switching unit for opening said check valve in response to said opening signal.

8. The tank-venting arrangement of claim 6, said check valve being a valve which is closed in the non-driven condition.

* * * * *

UNITED STATES PATENT AND TRADEMARK OFFICE
CERTIFICATE OF CORRECTION

PATENT NO. : 5,197,442

DATED : March 30, 1993

INVENTOR(S) : Andreas Blumenstock, Helmut Denz, Ulrich Steinbrenner and Ernst Wild It is certified that error appears in the above-identified patent and that said Letters Patent is hereby corrected as shown below:

In column 2, line 45: between "for" and "possible", insert -- a --.

In column 4, line 47: delete "the" and substitute -- The -- therefor.

In column 7, line 1: delete "settin" and substitute -- setting -- therefor.

In column 7, line 12: between "and" and "check", insert -- a --.

Signed and Sealed this

Fourth Day of January, 1994

Attest:

BRUCE LEHMAN

*Attesting Officer*     *Commissioner of Patents and Trademarks*